(12) United States Patent
Pedersen et al.

(10) Patent No.: US 10,204,057 B2
(45) Date of Patent: Feb. 12, 2019

(54) MEMORY EMULATION MECHANISM

(71) Applicant: Atmel Corporation, San Jose, CA (US)

(72) Inventors: Frode Milch Pedersen, Trondheim (NO); Sylvain Garnier, Nantes (FR); Ian Fullerton, Los Gatos, CA (US); Xavier Leprevost, Saint Mars du Desert (FR)

(73) Assignee: Atmel Corporation, San Jose, CA (US)

( * ) Notice: Subject to any disclaimer, the term of this patent is extended or adjusted under 35 U.S.C. 154(b) by 42 days.

(21) Appl. No.: 15/294,413

(22) Filed: Oct. 14, 2016

(65) Prior Publication Data

US 2018/0046582 A1 Feb. 15, 2018

Related U.S. Application Data

(60) Provisional application No. 62/372,726, filed on Aug. 9, 2016.

(51) Int. Cl.
*G06F 12/10* (2016.01)
*G06F 12/1009* (2016.01)
*G06F 12/02* (2006.01)
*G06F 3/06* (2006.01)

(52) U.S. Cl.
CPC ........ *G06F 12/1009* (2013.01); *G06F 3/0611* (2013.01); *G06F 3/0659* (2013.01); *G06F 3/0679* (2013.01); *G06F 12/0246* (2013.01); *G06F 2212/2022* (2013.01); *G06F 2212/7201* (2013.01)

(58) Field of Classification Search
CPC .... G06F 3/0679; G06F 3/0608; G06F 3/0617; G06F 3/0613; G06F 3/064; G06F 3/0656; G06F 12/10; G06F 12/0246; G06F 2212/2022; G06F 2212/7211; G06F 12/1009; G06F 3/0659; G06F 3/0611; G06F 2212/7201
See application file for complete search history.

(56) References Cited

U.S. PATENT DOCUMENTS 5,777,942 A * 7/1998 Dosaka ................. G11C 11/005
365/189.05
2015/0227316 A1* 8/2015 Warfield ............... G06F 3/0611
711/103
2017/0102874 A1* 4/2017 Ouchi ..................... G06F 3/061

* cited by examiner

*Primary Examiner* — Hiep T Nguyen
(74) *Attorney, Agent, or Firm* — Fish & Richardson P.C.

(57) ABSTRACT

In an embodiment, a method comprises: obtaining a virtual bus address; translating the virtual bus address to a physical address of a portion of NVM storing first data; determining that the first portion of NVM has been allocated previously; reading the first data from the first portion of NVM; determining whether writing second data to the first portion of the NVM would change one or more bits in the first data; responsive to the determining that a write operation only changes data bits in the first data from 1 to 0, writing the second data over the first data stored in the first portion of NVM; and responsive to the determining that one or more bits in the first data would be flipped from 0 to 1, reallocating the first portion of NVM to a second portion of NVM, copying the first data from the first portion of NVM to the second portion of NVM with the first data modified by the second data.

16 Claims, 8 Drawing Sheets

MEMORY EMULATION MECHANISM

CROSS-REFERENCE TO RELATED APPLICATION

This application claims priority to U.S. Provisional Patent Application No. 62/372,726, filed on Aug. 9, 2016, the entire contents of which are incorporated herein by reference.

TECHNICAL FIELD

The subject matter of this disclosure relates generally to memory management systems for microcontrollers and other devices.

BACKGROUND

Many microcontrollers with embedded non-volatile memory (NVM) use NOR flash technology. Bits can be written to NOR flash memory from 1 to 0 by a program operation. The program operation is relatively fast and is performed on individual bits. A page of NOR flash memory can be programmed multiple times without erasing. However, the individual bits in the page can only be set from 0 to 1 by an erase operation. The erase operation is slow and typically performed on blocks of bits.

SUMMARY

The disclosed embodiments emulate hardware erasable programmable read-only memory (EEPROM) operations in NVM.

In an embodiment, a method comprises: obtaining, by a memory controller, a virtual bus address; translating, by the memory controller, the virtual bus address to a physical address of a portion of non-volatile memory (NVM) storing first data; determining, by the memory controller, that the first portion of NVM has been allocated previously; reading, by the memory controller, the first data from the first portion of NVM; determining, by the memory controller, whether writing second data to the first portion of the NVM would change one or more bits in the first data; responsive to the determining that a write operation only changes data bits in the first data from 1 to 0, writing the second data over the first data stored in the first portion of NVM; and responsive to the determining that one or more bits in the first data would be flipped from 0 to 1, reallocating the first portion of NVM to a second portion of NVM, copying the first data from the first portion of NVM to the second portion of NVM with the first data modified by the second data.

In an embodiment, a system comprises: non-volatile memory (NVM); and a memory controller coupled to the NVM, the memory controller operable to: obtain a virtual bus address; translate the virtual bus address to a physical address of a portion of non-volatile memory (NVM) storing first data; determine that the first portion of NVM has been allocated previously; read the first data from the first portion of NVM; determine whether writing second data to the first portion of the NVM would change one or more bits in the first data; respond to the determining that a write operation only changes data bits in the first data from 1 to 0, by writing the second data over the first data stored in the first portion of NVM; and respond to the determining that one or more bits in the first data would be flipped from 0 to 1, by reallocating the first portion of NVM to a second portion of NVM, copying the first data from the first portion of NVM to the second portion of NVM with the first data modified by the second data.

DETAILED DESCRIPTION

Example Bus Address Mapping

Figure 1:
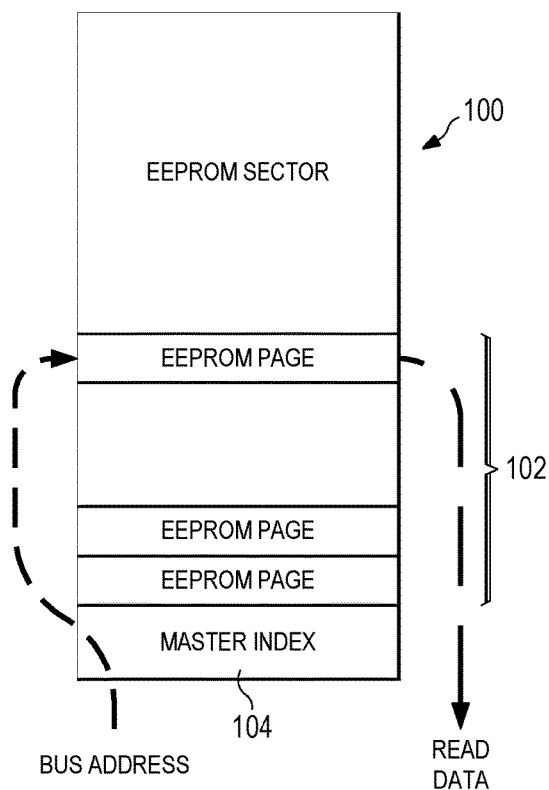
FIG. 1 illustrates a mapping from bus addresses to EEPROM addresses using a master index, according to an embodiment.
Figure 2:
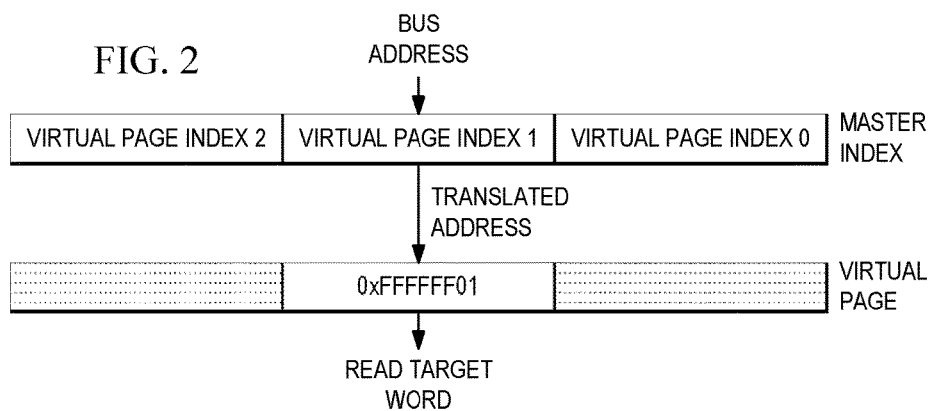
FIG. 2 illustrates translating bus addresses to physical EEPROM page addresses using a master index, according to an embodiment.

FIGS. 1 and 2 illustrate mapping bus addresses to EEPROM addresses using a master index, according to an embodiment. Referring to FIG. 1, an EEPROM sector (EES) 100 contains a number of EEPROM pages (EEP) 102 reserved for EEPROM emulation. While EEPs 102 can be programmed independently, all pages in EES 100 are erased at the same time. Data is addressed as virtual EEPROM pages, which are mapped to continuous bus addresses like conventional NVM. Master index 104 within EES 100 is used to translate the virtual EEPROM addresses to the physical addresses of the EEPs 102. Referring to FIG. 2, master index 104 contains pointers mapping the virtual EEPROM pages to EEPs 102. Master index 104 contains one pointer per virtual page mapped to EES 100. In an embodiment, the most significant bits of the bus address are used to identify the page index, while the least significant bits are not translated and used to identify the word position within the page.

Example Write Procedure

Figure 3:
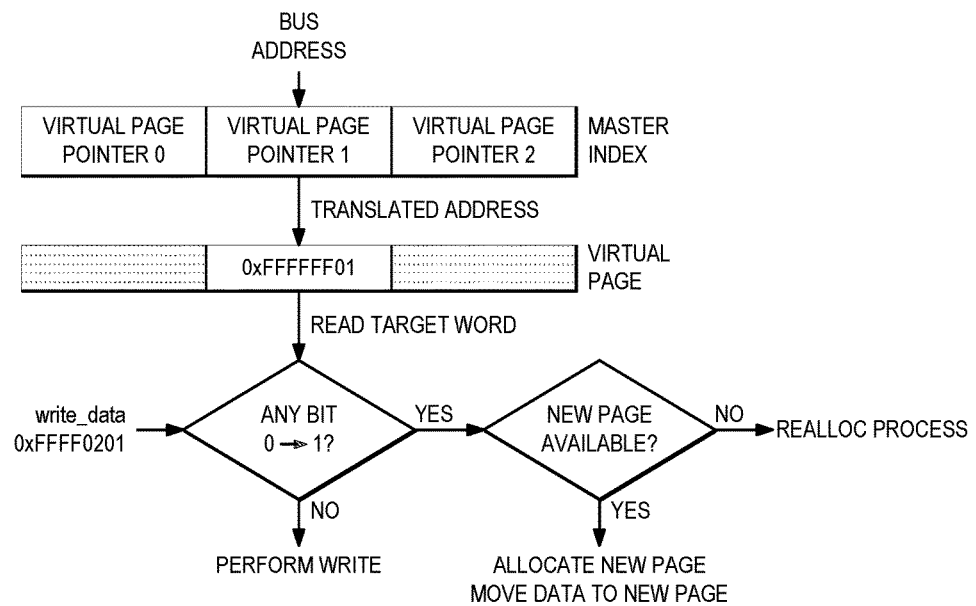
FIG. 3 illustrates a write procedure when changing a word in an EEPROM page, according to an embodiment.

FIG. 3 illustrates a write procedure when changing a word in an EEPROM page, according to an embodiment. In an embodiment, the master index starts in an erased state (all 1s). A pointer in master index containing all 1s is considered not allocated. When writing to a virtual page, the pointer is read first from the master index. If the page has not yet been allocated (pointer is all 1s), a new EEP is allocated for the data and the data is written in the new EEP. Two write modes can be configured: unbuffered and buffered. In unbuffered write mode, data is programmed immediately to the NVM array. In buffered write mode, data is written to the NVM block's page buffer and programmed when another page is addressed. If the page has been allocated previously, the translated address is read before any write operation takes place.

If the write operation only changes data bits from 1 to 0, the write operation can be committed to the existing EEP and overwrites any data already stored in the target word. If one or more bits need to be flipped from 0 to 1, the EEP is reallocated to a new blank EEP. All data is copied from the old EEP to the new EEP, but with the target word modified to its new value. The page pointer in the master index is updated to point to the new EEP.

Example Allocation of New EEPROM Pages

Figure 4:
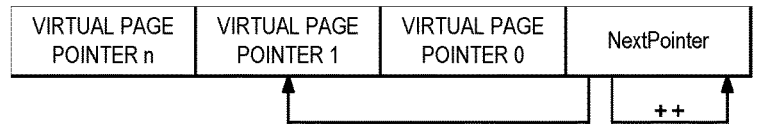
FIG. 4 illustrates allocating a new EEPROM page to a virtual page within the master index, according to an embodiment.

FIG. 4 illustrates allocating a new EEPROM page to a virtual page within the master index, according to an embodiment. The master index contains a NextPointer pointing to the next unallocated EEP in the EES. When a new EEP needs to be allocated for a virtual page, the Next Pointer is copied to the virtual page pointer in the master index and the NextPointer is updated. To ensure that incrementing pointers can be programmed to the master index with no need for erasing, a special inverted one-hot encoding can be used:

$0 \times 00 = 0b1 \ldots 1111$ $0 \times 01 = 0b1 \ldots 1110$ $0 \times 02 = 0b1 \ldots 1100$ $0 \times 03 = 0b1 \ldots 1000$

...

This encoding ensures that programming a higher number will result in changing bits from 1 to 0 and overwrite any lower number without the need for an erase operation.

Example Sector Allocation and Cleanup

Figure 5:
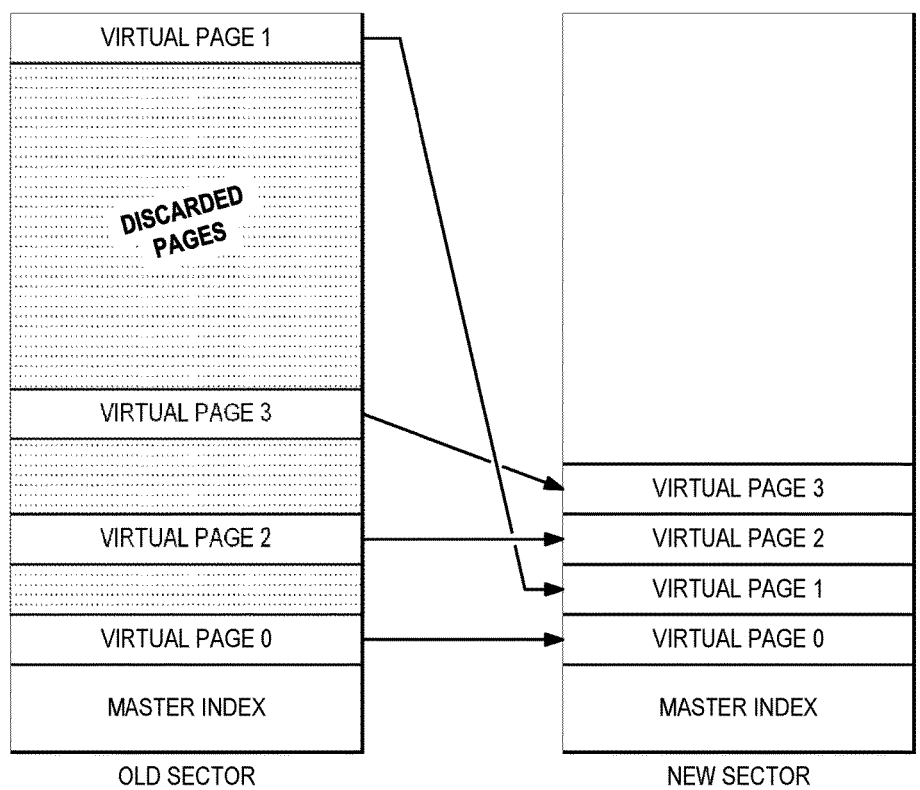
FIG. 5 illustrates reallocation of active pages to a new sector when the old sector is full, according to an embodiment.

FIG. 5 illustrates reallocation of active pages to a new sector when the old sector is full, according to an embodiment. The sequence described above can be repeated until there are no free EEPs in the EES. After this, the valid EEPs in sector can be copied to a spare, erased sector. After this, the original EES can be erased, becoming the new spare sector. The copying procedure will sequentially go through the master index to identify the valid EEPs in the current sector and copy them over to the new sector. Unallocated virtual pages are not copied. Once the copy has been completed, the old sector can be erased. At this point, the new sector has become the active sector, and the old sector the spare sector.

Example Data Deallocation

If a virtual page has been allocated to a physical page, it occupies one available page indefinitely even if it no longer is in use. To free up pages, it is possible to explicitly deallocate pages by writing a non-volatile DEALLOC word located in the master index. Each bit in the DEALLOC word corresponds to an addressable virtual page. All bits default to 1, indicating the page is available for use. If the user writes the bit to 0, the page is deallocated and can no longer be used by the application. The page is then no longer copied to the new sector when the current sector is full and thus no longer occupies any physical pages.

Example Wear Leveling

An advantage of the disclosed memory emulation technique is the efficient usage of the available NVM space to offer higher endurance for stored data. A key advantage of a traditional EEPROM is the ability to modify data many times before the NVM wears out; this can be 1-2 orders of magnitude higher than what can be guaranteed with a flash design. To emulate this high endurance in a flash, wear leveling is needed, i.e. the same page is written to different physical pages in the flash, to reduce the wear on each physical flash page. Typically most EEPROM data is written rarely, but a few locations need very high endurance. Since the disclosed emulation mechanism allows the virtual page to be stored to any page available within the two EEPROM sectors, it is possible to offer very high endurance if only a single page is written. It is possible to further increase the wear leveling by exploiting the fact that a page can be reprogrammed without reallocation if only writing 0 bits to the page. For example, if making a monotonic NVM counter, it is possible to use an inverted one-hot numerical representation, like the pointers in the master index. Depending on the use case, and the amount of NVM allocated for EEPROM emulation, the effective endurance could become far higher than for a true EEPROM.

Relation of Sector and Page Configuration To Physical Flash Properties

In an embodiment, two EEPROM sectors are allocated for the EEPROM emulation. If possible, it is an advantage to locate these in a part of NVM with read-while-write properties compared to the program execution, making it possible to write to the EES while the program keeps executing. The number of bytes in the EES can correspond to a multiple of the erase granularity of the NVM block. For example, if the NVM can be erased on an 8 KB granularity, the EES size can be 8 KB, 16 KB, 24 KB, etc.

In principle, there can be an arbitrary number of EEPs in one EES, although some practical limitations apply. Address decoding is easier if the number of bytes in the EEP is a power of 2. The number of EEPs in one EES can still be an arbitrary integer. However, due to the pointer encoding in the master index, it should not exceed the number of bits read from the flash in one operation. For example, for a 128-bit flash, one EES should contain up to 128 EEPs. Most flash blocks contain a page buffer, which is useful for implementing buffered writes, or new page allocations. The number of bytes in the EEP should not exceed the number of bytes in the page buffer. In an embodiment, the number of bits read in one operation should be greater than the number of virtual pages to ensure there are more physical pages than virtual pages. Otherwise if these numbers were equal, the controller would reallocate sectors forever.

Virtual Page Deallocation Mechanisms

The hardware EEPROM emulation described above associates a virtual page with a physical page. A physical page can be associated to any virtual page and holds a data version of the virtual page which can be the latest one or an old one therefore no more valid. When the physical page pool becomes empty a sector reallocation procedure copies all valid page versions to an erased sector. But as soon as one virtual page is allocated, a physical page is removed from the pool. The NVM wear is then leveled on less physical pages when overwriting useful virtual pages and sector reallocation is triggered more often having an impact on the device energy consumption and also performance.

As described previously above, when a virtual page is marked to be deallocated, the page is not reallocated during the next sector reallocation. An EEPROM can be used in many ways by users which are difficult to predict. The deallocation mechanism requires a good knowledge of the hardware EEPROM emulation scheme. The address boundaries of the data section must be translated to deallocate to virtual page indices and checked to determine that no useful information is stored along with the data to deallocate since a virtual page contains a variable number of bytes (quasi-static user configuration). Therefore a specific software driver is needed to take advantage of this mechanism and special care should be taken not to erase useful data.

To address these shortcomings, an implicit virtual page deallocation procedure is described below where detection is performed by monitoring the written data. The principle is that a virtual page is marked to be deallocated if the user overwrites existing data with all 1s, which is the default value returned when reading an unallocated virtual page. Thus no specific software driver is needed to deallocate virtual pages. Rather, the EEPROM pages are deallocated and deprecated data is overwritten with all 1s, which is the default value of unallocated virtual pages. This method can be used without deep knowledge of the hardware EEPROM emulation module internals. The user does not have to check virtual page boundaries in the system address space; the user just needs to override previous data with any supported bus granularity. Depending on the mode (buffered or unbuffered) of implicit virtual page deallocation the detection is performed differently to optimize the deallocation procedure.

Implicit Virtual Page Deallocation When in Unbuffered Mode

A virtual page can be allocated or unallocated. In the case where the virtual page is unallocated the page returns a default value when read (all 1s). Implicit de-allocation includes filtering out virtual pages that contain only 1s during sector reallocation. For example, the virtual page content is checked and if it is all 1s then the virtual page is skipped freeing one physical page. This mechanism is simple and useful for infrequent use. In the case of large deallocation, the unbuffered mode may not be suitable since it requires the allocation of a new physical page for each word overwriting non all 1s data.

Figure 6:
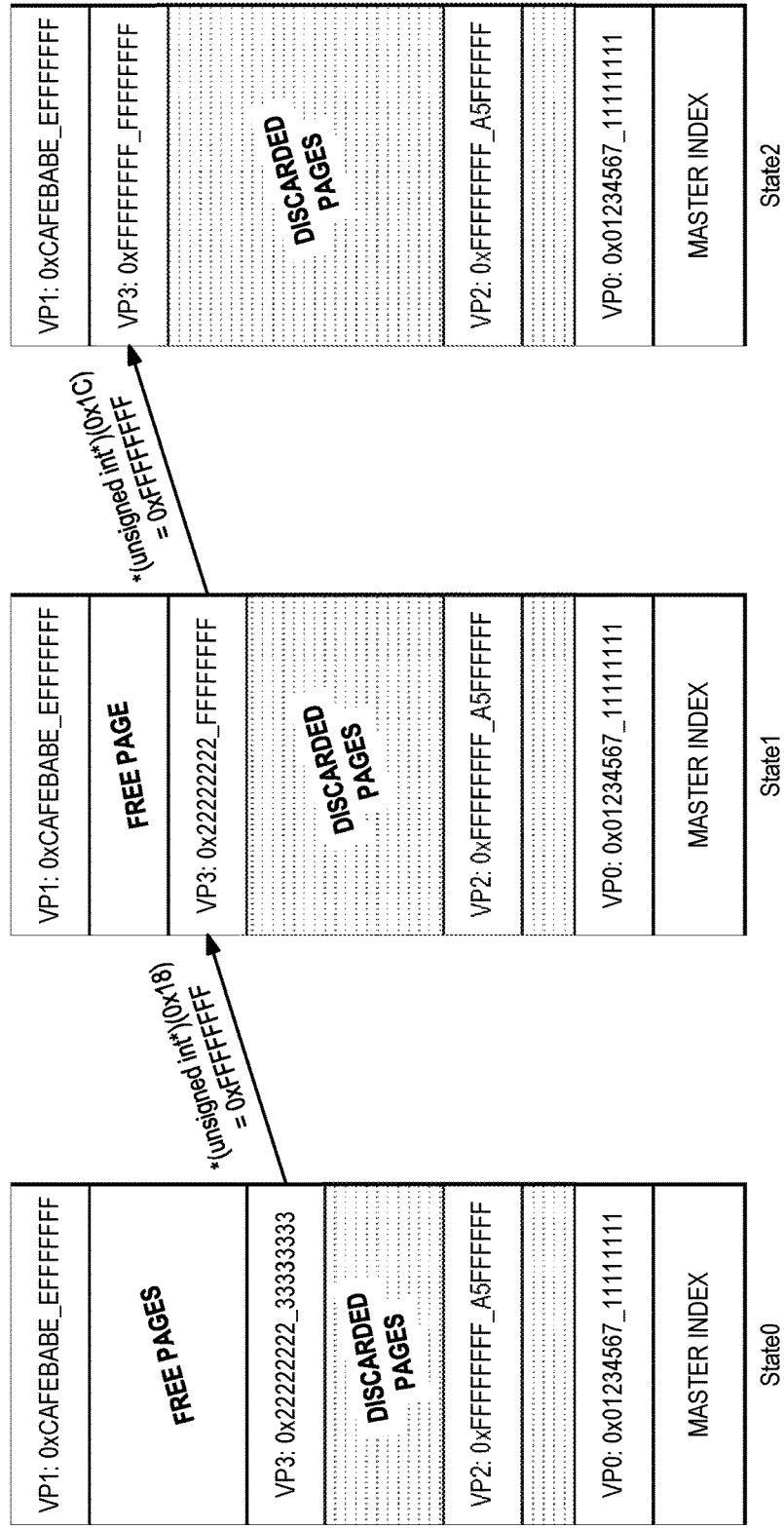
FIGS. 6 and 7 illustrate implicit virtual page deallocation when in unbuffered mode, according to an embodiment.
Figure 7:
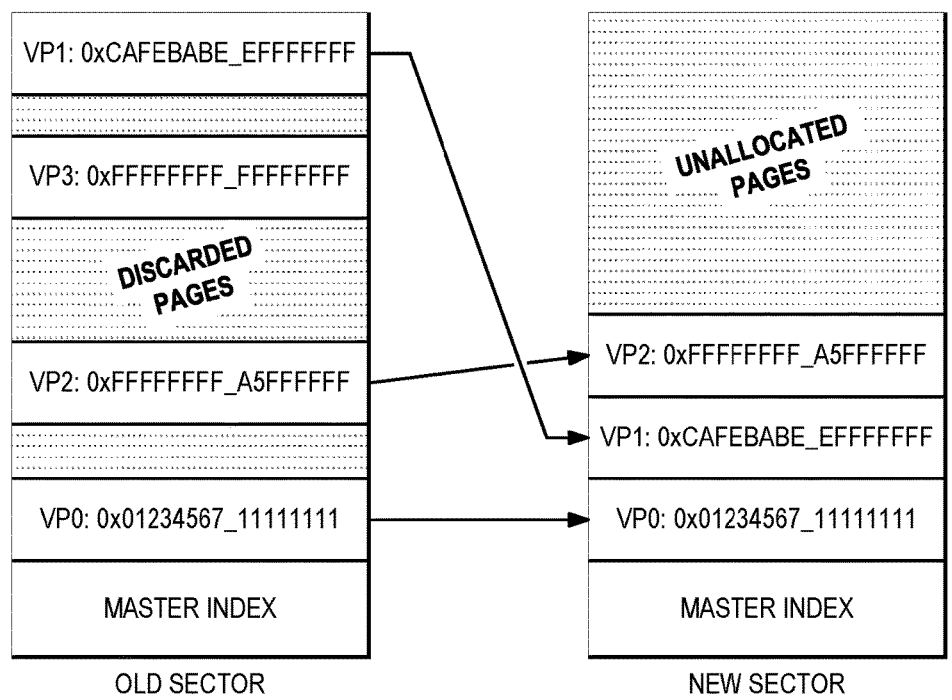

Referring to FIG. 6, an example of implicit virtual page deallocation when in unbuffered mode is illustrated. In this example, we assume an 8-byte page size (PSZ), virtual page 3 (VP3) is allocated and stores data 0x22222222_33333333, a byte granularity address space and a system bus that supports 8-bit, 16-bit and 32-bit writes. VP3 contains bytes 0x18, 0x19, 0x1A, 0x1B, 0x1C, 0x1D, 0x1E and 0x1F. In State0, VP3 is allocated but the user wants to deallocate it. In State1, the user just wrote 0xFFFFFFFF to @0x18, bytes 0x18 to 0x1B which are now are all 1s. In State2, the user just wrote 0xFFFFFFFF to @0x1C, bytes 0x1C to 0x1F, which now are all 1s. Accordingly, for each write one virtual page allocation is needed if there is at least one bit at 0 in the data to be replaced. Referring to FIG. 7, when the sector reallocation procedure starts, VP3 data is read at all is and therefore is not reallocated. VP3 is unallocated in the new sector when the sector reallocation procedure completes.

Implicit Virtual Page Deallocation When in Buffered Mode

Figure 8:
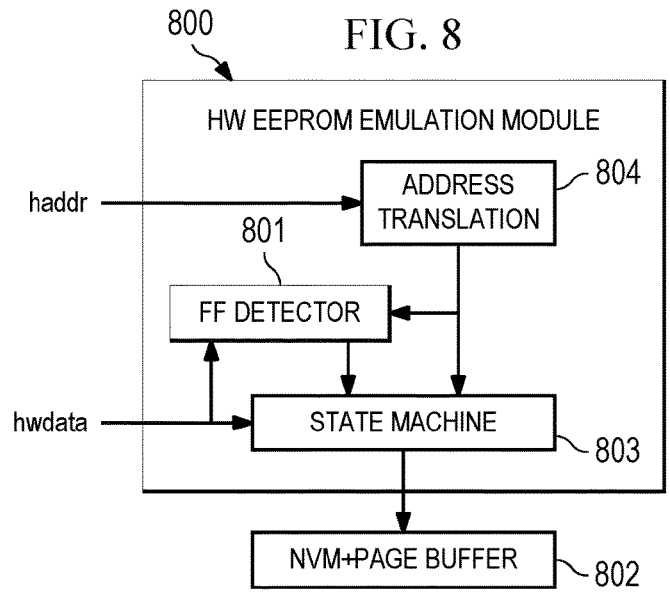
FIGS. 8-10 illustrates implicit virtual page deallocation when in buffered mode, according to an embodiment.
Figure 9:
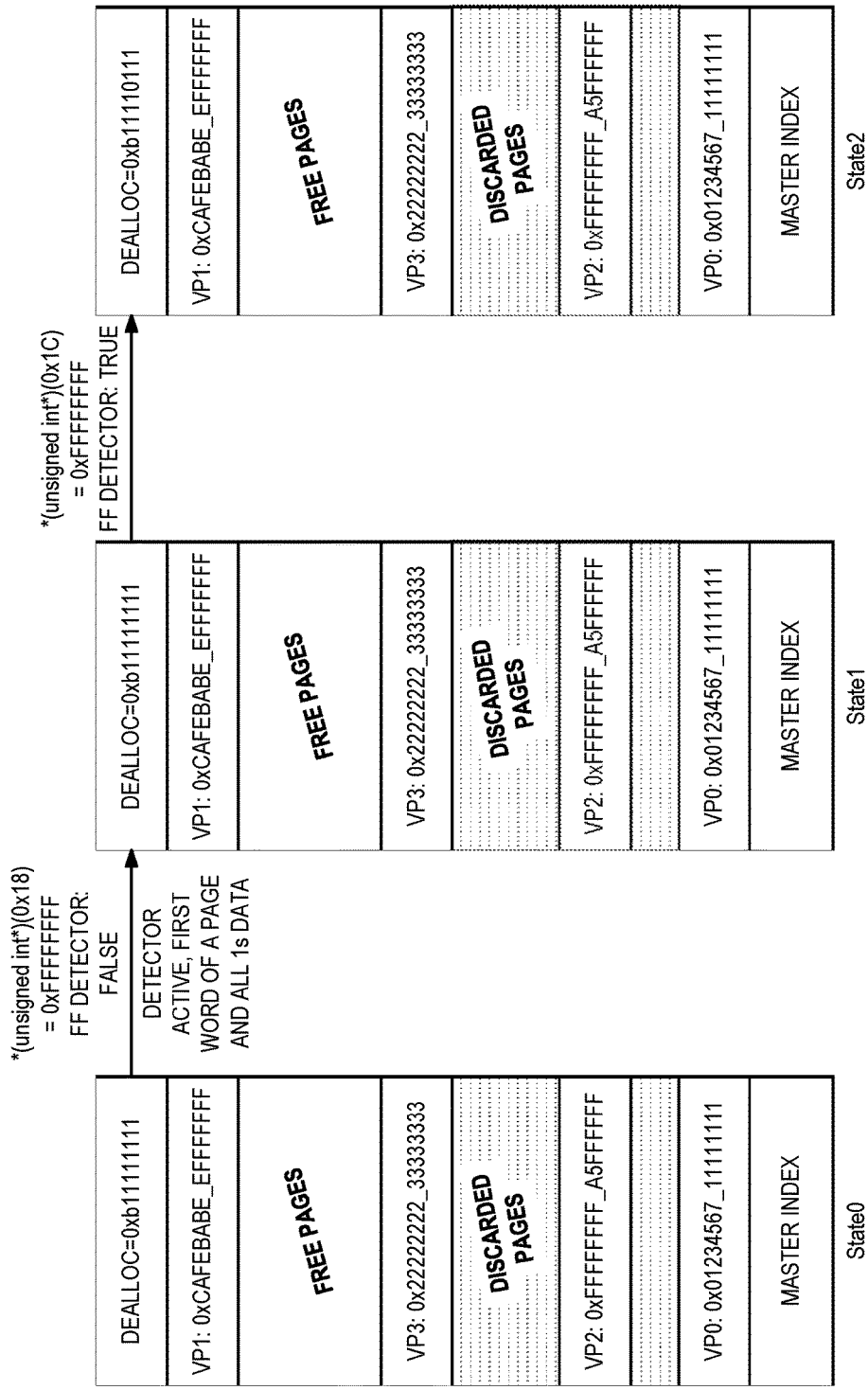
Figure 10:
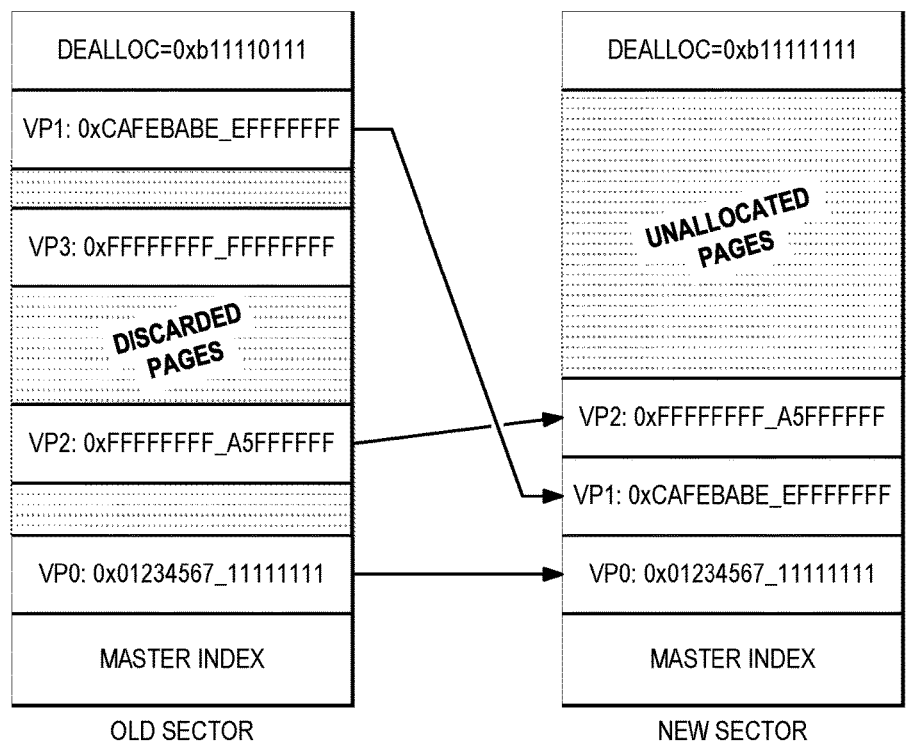

FIGS. 8-10 illustrate implicit virtual page deallocation when in buffered mode, according to an embodiment. Buffered mode is a specific mode where the HW EEPROM emulation algorithm takes advantage of the NVM page buffer to reduce the amount of NVM page programming operations, as previously described above.

Referring to FIG. 8, a hardware emulation module 800 includes FF detector 801 that monitors bus write operations into NVM page buffer 802. If FF detector 801 detects that page buffer 802 has been fully and sequentially written to all 1s then state machine 803 programs a word in the NVM to indicate that the current virtual page is to be deallocated. FF detector 801 starts page buffer 802 is written to all 1s at offset 0 and stops when write addresses are not in sequence. Note that FF detector 801 can handle different transfer sizes and size mixing. FF detector 801 instructs state machine 803 when page buffer 802 contains all 1s when the last page buffer offset has been written all is with FF detector 801 still active. In this case state machine 803 programs bit x of the DEALLOC word. The DEALLOC word was previously described above and is a reserved word in the NVM like the virtual page indices and next available page index.

The actual deallocation will take place during the next sector reallocation procedure. Hardware emulation module 800 checks the data coherency regarding the marked virtual page. If a read is performed in a marked virtual page, returned data is the default data for unallocated pages (all 1s). If a write operation is performed in a marked virtual page, a page reallocation is not possible since one bit of the DEALLOC word cannot be individually erased. Therefore a sector reallocation is automatically started. This situation is a software issue since it will dramatically impact system performance. Even if the write is buffered, if any read or write is issued during the sector reallocation the system bus will stall a very long time.

Referring to FIG. 9, an implicit virtual page deallocation for the buffered mode is illustrated. In this example, we assume an 8-byte page size (PSZ), 8 EEPROM pages, VP3 is allocated and stores data 0x22222222_33333333, a byte granularity address space and a system bus that supports 8-bit, 16-bit and 32-bit writes. VP3 contains bytes 0x18, 0x19, 0x1A, 0x1B, 0x1C, 0x1D, 0x1E and 0x1F. In State0, VP3 is allocated but the user wants to deallocate it. In State1, the user just wrote 0xFFFFFFFF to @0x18 and bytes 0x18 to 0x1B and the page buffer is updated accordingly. FF detector 801 is started and detects that the first 4 bytes are all 1s. FF detector 801 the waits for a contiguous write. In State2, the user just wrote 0xFFFFFFFF to @0x1C and bytes 0x1C to 0x1F. FF detector 801 instructs state machine 803 that page buffer 802 is all 1s. State machine 803 writes a 0 in DEALLOC[3] to mark the virtual page to be deallocated. Next, reads to this virtual page will return all is as long as DEALLOC[3] holds at 0. It will be erased after the next sector reallocation.

Note that in the buffered mode there is no page reallocation. The only operation in NVM is the DEALLOC programming that takes place after writing a full EEPROM page. Referring to FIG. 10, when the sector reallocation procedure starts VP3 is not reallocated because DEALLOC

[3] is low. VP3 is unallocated in the new sector when the sector reallocation procedure completes.

As shown in TABLE I below, the implicit deallocation mechanisms described above allow software ease of use since allocation and deallocation are performed using simple store operations in the same address space.

TABLE I

Comparison of Implicit and Explicit Deallocation

|  | Implicit Deallocation | Explicit Deallocation |
|---|---|---|
| Bus complexity | Needs data interface only | Needs data interface and a command interface to process the deallocation command |
| Software complexity | Simple guideline (overwrite data to de-allocate with 1s) | Complex software checks: need to check boundaries of sections to deallocate before calling the DEALLOC command to avoid the deallocation of useful data. Potential need for advanced linker scripts. |

Figure 11:
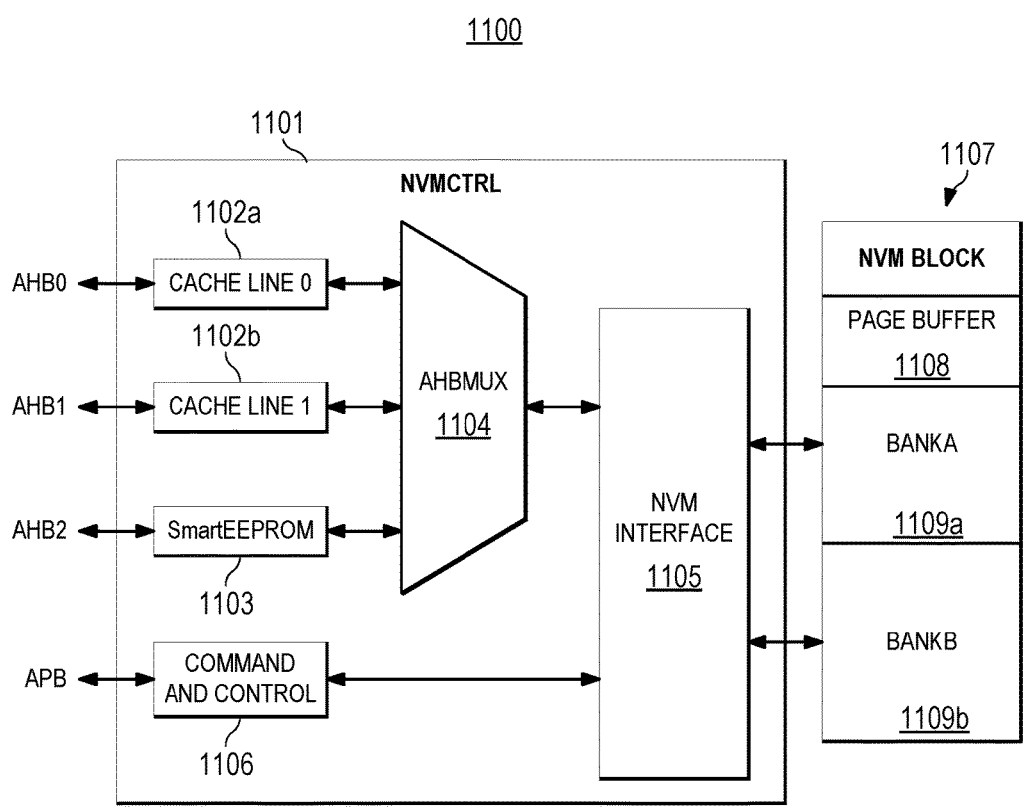
FIG. 11 is a block diagram of a memory system operable to perform the processes and procedures described in reference to FIGS. 1-10.

FIG. 11 is a block diagram of a memory system 1100 operable to perform the processes and procedures described in reference to FIGS. 1-10. In an embodiment, system 1100 includes memory controller 1101, cache lines 1102a, 1102b, EEPROM emulator 1103, multiplexer 1104, NVM interface 1105 and command and control block 1106. System 1100 is shown coupled to NVM 1107, which includes a page buffer 1108 and memory banks 1109a, 1109b. Memory controller 1101 is coupled to a system bus through a bus interface 1108. Cache lines 1102a, 1102b and EEPROM emulator 1103 are multiplexed into NVM interface 1105 by multiplexer 1104. Command and control block 1106 receives commands from the system bus over bus interface 1108 and controls access operations on NVM 1107 in response to the commands through NVM interface 1105. EEPROM emulator 1103 uses two sectors that can be physically located in the last blocks of memory banks 1109a, 1109b, respectively. The use of sectors in EEPROM emulation was previously described with reference to FIGS. 1-10.

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:
1. A method comprising:
   obtaining, by a memory controller, a virtual bus address;
   translating, by the memory controller, the virtual bus address to a physical address of a first portion of non-volatile memory (NVM) storing first data;
   determining, by the memory controller, that the first portion of NVM is currently allocated;
   reading, by the memory controller, the first data from the first portion of NVM;
   determining, by the memory controller, whether writing second data to the first portion of the NVM would change one or more bits in the first data;
   responsive to the determining that a write operation only changes data bits in the first data from 1 to 0, writing the second data over the first data stored in the first portion of NVM;
   responsive to the determining that one or more bits in the first data would be flipped from 0 to 1, reallocating the first portion of NVM to a second portion of NVM, copying the first data from the first portion of NVM to the second portion of NVM with the first data modified by the second data;
   obtaining, by the memory controller, a virtual pointer to the physical address from an index stored in the NVM, wherein the index includes a next pointer pointing to a next unallocated portion of NVM;
   translating, by the memory controller, the virtual bus address to the physical address using the virtual pointer;
   determining that a new portion of the NVM needs to be allocated; and
   copying the next pointer to the virtual pointer in the index.

2. The method of claim 1, wherein most significant bits of the virtual bus address are used to identify the first portion of NVM and least significant bits of the virtual bus address are used to identify a position in the first portion of NVM to be accessed.

3. The method of claim 1, further comprising:
   determining, by using a virtual pointer, that the first portion of NVM has not been allocated;
   allocating the first portion of NVM; and
   writing the first data into the first portion of NVM.

4. The method of claim 1, further comprising:
   determining a write mode; and
   writing the second data over the first data according to the write mode.

5. The method of claim 4, further comprising:
   determining that the write mode is a buffer mode;
   writing the second data to a buffer; and
   writing the second data from the buffer into the second portion of NVM when another portion of NVM is addressed.

6. The method of claim 1, further comprising:
   determining that there are no unallocated portions of NVM in a first sector of NVM;
   copying allocated portions of NVM to a second sector of NVM; and
   erasing the first sector of NVM.

7. The method of claim 6, further comprising:
   determining that a previously allocated portion of NVM is deallocated; and
   excluding the deallocated portion of NVM from the copying to the second sector of NVM.

8. The method of claim 6, wherein the first and second sectors are located in portions of the NVM with read-while-write properties.

9. A system comprising:
   non-volatile memory (NVM); and
   a memory controller coupled to the NVM, the memory controller:
      obtaining a virtual bus address;
      translating the virtual bus address to a physical address of a first portion of non-volatile memory (NVM) storing first data;
      determining that the first portion of NVM is currently allocated;

reading the first data from the first portion of NVM;
determining whether writing second data to the first portion of the NVM would change one or more bits in the first data;
responding to the determining that a write operation only changes data bits in the first data from 1 to 0 by writing the second data over the first data stored in the first portion of NVM;
responding to the determining that one or more bits in the first data would be flipped from 0 to 1 by reallocating the first portion of NVM to a second portion of NVM, and copying the first data from the first portion of NVM to the second portion of NVM with the first data modified by the second data;
obtaining, by the memory controller, a virtual pointer to the physical address from an index stored in the NVM, wherein the index includes a next pointer pointing to a next unallocated portion of NVM;
translating, by the memory controller, the virtual bus address to the physical address using the virtual pointer;
determining that a new portion of NVM needs to be allocated; and
copying the next pointer to the virtual pointer in the index.

10. The system of claim 9, wherein most significant bits of the virtual bus address are used to identify the first portion of NVM and least significant bits of the virtual bus address are used to identify a position in the first portion of NVM to be accessed.

11. The system of claim 9, further comprising:
determining, by the virtual pointer, that the first portion of NVM has not been allocated;
allocating the first portion of NVM; and
writing the first data into the first portion of NVM.

12. The system of claim 9, further comprising:
determining a write mode; and
writing the second data over the first data according to the write mode.

13. The system of claim 12, further comprising:
determining that the write mode is a buffer mode;
writing the second data to a buffer; and
writing the second data from the buffer into the second portion of NVM when another portion of NVM is addressed.

14. The system of claim 9, further comprising:
determining that there are no unallocated portions of NVM in a first sector of NVM;
copying allocated portions of NVM to a second sector of NVM; and
erasing the first sector of NVM.

15. The system of claim 14, further comprising:
determining that a previously allocated portion of NVM is deallocated; and
excluding the deallocated portion of NVM from the copying to the second sector of NVM.

16. The system of claim 14, wherein the first and second sectors are located in portions of the NVM with read-while-write properties.

* * * * *